L. J. TREMBLEY.
PISTON RING.
APPLICATION FILED SEPT. 20, 1920.

1,385,508.

Patented July 26, 1921.

Inventor
Lou. J. Trembley.
By
Attorney

UNITED STATES PATENT OFFICE.

LOU J. TREMBLEY, OF DENVER, COLORADO, ASSIGNOR, BY DIRECT AND MESNE ASSIGNMENTS, OF ONE-HALF TO WILLIAM COHAGEN AND ONE-HALF TO WILLIAM WYSCARVER, JR., BOTH OF DENVER, COLORADO.

PISTON-RING.

1,385,508.   Specification of Letters Patent.   Patented July 26, 1921.

Application filed September 20, 1920. Serial No. 411,612.

*To all whom it may concern:*

Be it known that I, LOU J. TREMBLEY, a citizen of the United States, residing in the city and county of Denver and State of Colorado, have invented certain new and useful Improvements in Piston-Rings; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates broadly to improvements in packings for pistons, and while well adapted for use with pistons generally, is particularly advantageous in connection with those used in the cylinders of explosion engines. One important disadvantage or trouble in connection with machines of this character, is that the oil from the crank case moves past the pistons and into the explosion chambers of the cylinders and is burned during the explosions of the gas and produces relatively large amounts of carbon in the cylinders and fouls the electrodes of the spark plugs.

Heretofore, so far as I am aware, attention has been directed to the prevention of the passage of an abnormal amount of oil between the inner wall of the cylinder and the outer surfaces of the piston rings. I have found by careful inspection and demonstration that the oil which reaches the explosion chambers from the crank case, passes into the circular grooves of the pistons underneath the piston rings, rather than between the outer surfaces of the rings and the adjacent wall of the cylinder, hence my improvement is constructed with this idea in view, and consists of a composite piston ring consisting of an inner layer of a suitable packing, as cork, which is located in the groove or grooves of the piston, and an outer expansion ring of any suitable character. These rings, as is well known, are divided to permit the necessary expansion, and by virtue of this fact, under ordinary circumstances, and with the rings heretofore in vogue, it is comparatively easy for the oil to work through the groove and underneath the ring, for the reason that the tendency of the latter is to expand outwardly into engagement with the adjacent wall of the cylinder, leaving some space between the inner face of the ring and the bottom of the groove. My improvement overcomes this difficulty, since as the piston expands, due to the heat developed in the cylinder, resulting from the explosions, the piston ring or rings are forced into the cork layer in the bottom of the grooves, thus forming a seal to prevent the passage of the oil between the ring and the bottom of the groove, the inner surface of the ring being preferably V-shaped, to facilitate this result.

Having briefly outlined my improvement, I will proceed to describe the same in detail, reference being made to the accompanying drawings in which is illustrated an embodiment thereof.

Figure 1:
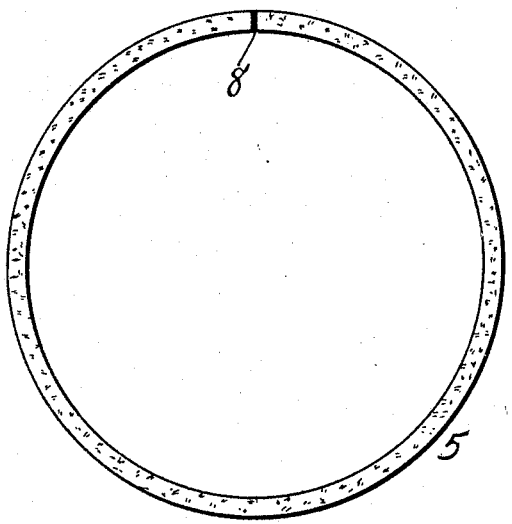
Figure 1 is an elevation of the cork member of my improved piston packing.
Figure 2:
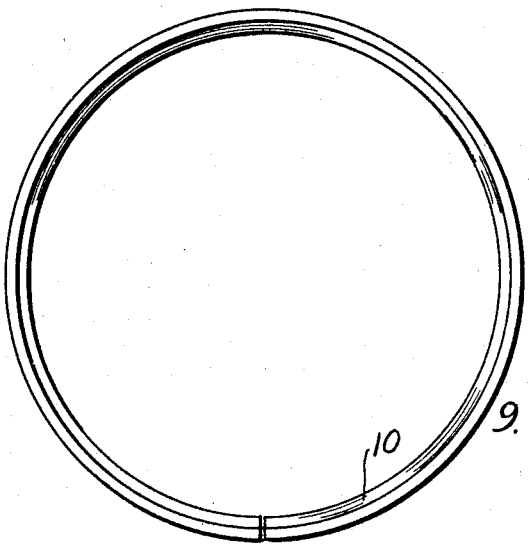
Fig. 2 is a similar view of one of the metallic piston rings employed in connection with the cork.
Figures 3, 4:
Figs. 3 and 4 are respectively edge views of the constructions shown in Figs. 1 and 2.
Figure 5:
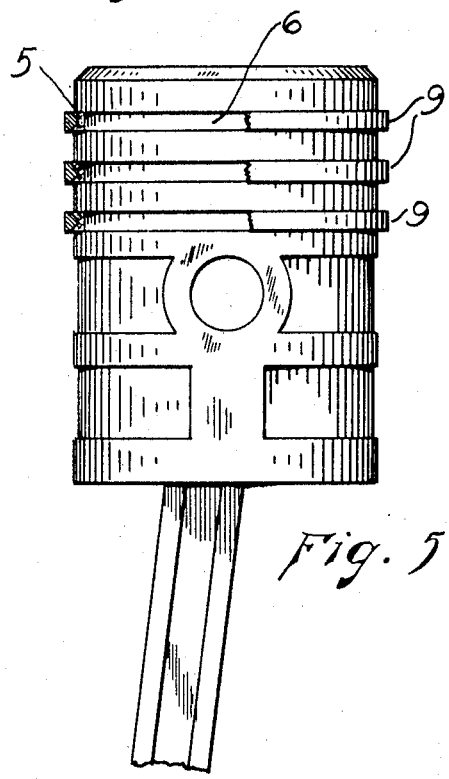
Fig. 5 is an elevation of a piston showing a number of my improved devices in place, the latter being shown in cross section and on a smaller scale than in the previous views.
Figure 6:
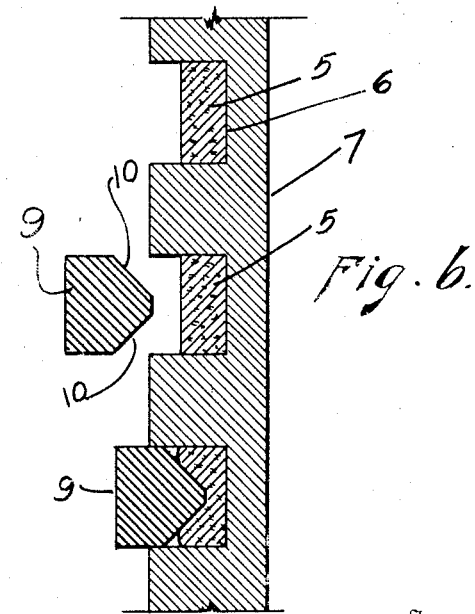
Fig. 6 is a longitudinal section taken through one wall of a hollow piston, showing my improved piston packing, on a larger scale.

The same reference characters indicate the same parts in all the views. Let the numeral 5 designate a layer of cork or other suitable packing adapted to be placed in the bottom of the circular groove 6 of a piston 7. This cork is crowded tightly into the groove and for this purpose its extremities may be separated as shown at 8. See Fig. 1. Outside of this cork member is placed a metallic expansion ring 9 of suitable construction. It is important, however, that the inner surface of this ring should be shaped to readily penetrate the cork packing, as illustrated in the lower part of Fig. 6. As shown in Figs. 5 and 6 of the drawing, three of my improved devices are applied to a piston. This is not necessary, as a single one of these devices will answer the purpose. As shown, the inner surface of the ring is V-shaped, having inclined walls 10 whereby they readily penetrate the cork member as the piston expands, due to heat, as illustrated in Fig. 6. By virtue of this result, a seal is formed between the cork and metallic members which prevents the oil from working through the grooves of the piston from the crank case. This seal prevents the entrance of an abnormal amount of oil into the expansion chambers of the cylinders of internal combustion engines. It also prevents any loss of compression for the same reason. It will be noted that as the piston moves outwardly in the cylinder or toward the upper extremity of the latter, there is a tendency to force one of the inclined walls of the piston ring toward the inner or lower portion of the cork member, thus making an absolutely tight seal. Again, during the reverse movement, there is the same tendency to force the opposite corresponding face of the piston ring toward the opposite or adjacent portion of the cork member, with the same result, thus making it impossible for any oil or explosive force to move past the piston by way of the grooves.

I have found by actual demonstration that my improved piston packing gives excellent results, and in fact prevents any abnormal amount of oil from passing from the crank case to the explosion chambers of the cylinders of engines of this character. Further, as heretofore stated, it positively prevents any loss of explosive force or compression because of the aforesaid seal.

I claim:

1. A piston packing composed of an outer expansion metallic ring and an inner layer of cork, the inner surface of the ring being constructed to readily penetrate the cork to form a seal.

2. A piston packing composed of an outer metallic ring having a V-shaped inner surface and an inner layer of cork adapted to be penetrated by the adjacent V-shaped surface of the ring.

3. A piston packing composed of an outer expansion metallic ring and an inner sealing member, the inner surface of the ring being constructed to penetrate the sealing member readily in order to form a seal.

4. A piston packing composed of an outer metallic ring having a V-shaped inner surface, and an inner layer of sealing material adapted to be penetrated by the adjacent V-shaped surface of the ring for sealing purposes.

In testimony whereof I affix my signature.

LOU J. TREMBLEY.